(No Model.)

J. W. SMITH.
HEATING APPARATUS.

No. 458,197. Patented Aug. 25, 1891.

Witnesses.
Edgar A. Godden
Edward F. Allen

Inventor.
John W. Smith
by Crosby & Gregory, Attys.

UNITED STATES PATENT OFFICE.

JOHN W. SMITH, OF BOSTON, MASSACHUSETTS.

HEATING APPARATUS.

SPECIFICATION forming part of Letters Patent No. 458,197, dated August 25, 1891.

Application filed August 30, 1890. Serial No. 363,531. (No model.)

*To all whom it may concern:*

Be it known that I, JOHN W. SMITH, a subject of the Queen of Great Britain, and residing at Boston, county of Suffolk, State of Massachusetts, have invented an Improvement in Heating Apparatus, of which the following description, in connection with the accompanying drawings, is a specification, like letters on the drawings representing like parts.

This invention has for its object to provide a novel heating apparatus especially adapted, among other things, to be used in laboratories, chemical factories, and like places, wherein rapid and uniform heating is desired, my improved apparatus being free from dirt, grease, &c., thereby enabling the laboratory or work-room to be kept clean and in a more sanitary condition.

In accordance with my invention a hollow mold or jacket provided with an inlet and outlet for steam or other heating agent is provided with a central depression or cavity, in which is placed the vessel to contain the substance to be heated, the said vessel having an enlarged upper portion resting upon the upper edge of the wall of the central cavity and its lower portion being surrounded by a fusible metal which readily melts and forms a molten layer or wall between the vessel and its heating-jacket.

My invention therefore consists, essentially, in a heating apparatus, it consisting of a heating-jacket provided with a cavity or depression, a vessel in said depression or cavity, and a layer or wall of fusible metal in the said cavity between the jacket and vessel, substantially as will be described.

Other features of my invention will be pointed out in the claim at the end of this specification.

Figure 1:
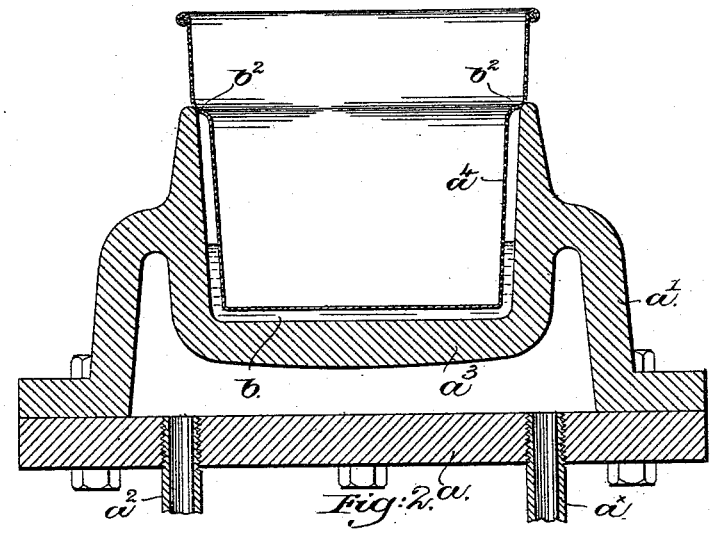
Figure 2:
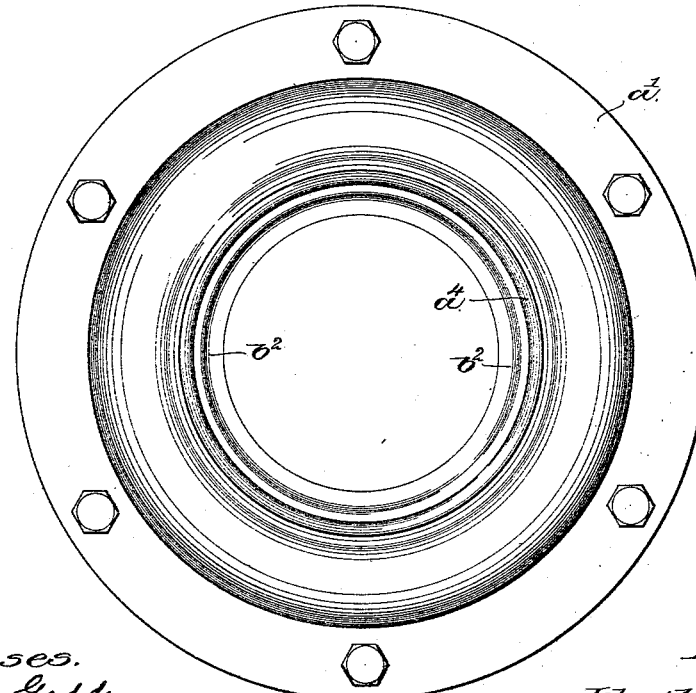

Figure 1 is a vertical section of a heating apparatus embodying my invention, and Fig. 2 a top or plan view of the apparatus shown in Fig. 1.

My improved heating apparatus consists of a hollow mold or jacket, herein shown as composed of a flat base $a$, provided with inlet and outlet pipes $a^\times$ $a^2$, an upright portion $a'$, provided with a central cavity or depression $a^3$, into which is placed the vessel $a^4$ to contain the substance to be heated, and which vessel may be of glass, porcelain, or other material. The vessel $a^4$ is of less diameter than the cavity or depression in the jacket, and between the bottom of the vessel and the bottom of the cavity is interposed a layer or wall $b$ of metal fusing at a substantially low melting-point and which when melted may extend up between the sides of the vessel and cavity.

The vessel $a^4$ at its upper portion is preferably made of larger diameter to form a supporting-rim $b^2$, which rests upon the edge of the cavity when the vessel is placed in operative position.

In operation the vessel $a^4$, containing the substance to be heated, is placed in the cavity upon the fusible metal, and the heating agent, which may be steam, hot air, liquid, or gas, is circulated through the jacket. The heat melts the fusible metal, which rapidly conducts the heat to the vessel $a^4$. In this manner the substance in the vessel $a^4$ may be gradually brought to the temperature desired, so that the said substance in a number of vessels $a^4$ may be brought to the said desired temperature in a required or desired time, and as a result a more uniform work is obtained, which is of especial advantage in laboratory work.

The vessel $a^4$ and its contents may readily be removed from its heating-jacket, and when removed the molten fusible metal remains in the cavity of the jacket, thereby obviating uncleanliness in the laboratory and rendering the same more sanitary.

I have herein shown the apparatus of circular shape; but I do not desire to limit myself in this respect, as it may be of any desired form.

I claim—

The combination of a hollow mold or jacket provided with an inlet and outlet for circulating a heating agent, and also provided with a central cavity and a removable vessel to contain that which is to be heated, constructed with an enlarged upper portion resting upon the upper edge of the wall of the central cavity and having its lower portion within the cavity surrounded by fusible metal, substantially as described.

In testimony whereof I have signed my name to this specification in the presence of two subscribing witnesses.

JOHN W. SMITH.

Witnesses:
   JAS. H. CHURCHILL,
   AUGUSTA E. DEAN.